United States Patent [19]
Winship

[11] Patent Number: 5,743,301
[45] Date of Patent: Apr. 28, 1998

[54] METAL PIPE HAVING UPSET ENDS

[75] Inventor: Thomas E. Winship, Houston, Tex.

[73] Assignee: Shaw Industries Ltd., Ontario, Canada

[21] Appl. No.: 562,449

[22] Filed: Nov. 24, 1995

Related U.S. Application Data

[60] Division of Ser. No. 338,959, Nov. 14, 1994, Pat. No. 5,517,843, which is a continuation-in-part of Ser. No. 214,391, Mar. 16, 1994, abandoned.

[51] Int. Cl.$^6$ .............................. F16L 9/02; B21D 41/02
[52] U.S. Cl. .............................. 138/109; 138/177; 72/318
[58] Field of Search ........................ 138/109, 177, 138/178, DIG. 11; 72/318, 370, 357

[56] References Cited

U.S. PATENT DOCUMENTS

| | | |
|---|---|---|
| 1,935,742 | 11/1933 | Hager . |
| 2,313,116 | 3/1943 | Babcock . |
| 4,100,781 | 7/1978 | Zawacki et al. .................. 72/318 X |
| 4,845,972 | 7/1989 | Takeuchi et al. . |
| 5,184,495 | 2/1993 | Chunn . |
| 5,361,846 | 11/1994 | Carlin et al. .................. 138/177 X |
| 5,375,449 | 12/1994 | Bononi .................. 72/318 X |
| 5,379,625 | 1/1995 | Hale . |

FOREIGN PATENT DOCUMENTS

| | | |
|---|---|---|
| 670010 | 9/1963 | Canada . |
| 532919 | 9/1931 | Germany . |
| 2812803 | 9/1979 | Germany . |
| 84633 | 5/1983 | Japan . |
| 118348 | 6/1985 | Japan . |
| 151136 | 6/1991 | Japan . |

*Primary Examiner*—Patrick Brinson
*Attorney, Agent, or Firm*—Bush, Riddle & Jackson, LLP

[57] ABSTRACT

A method for making an internal upset (20A) on metal drill pipe (10) having a transition section (24A) with a curved inner periphery (28A) of a concave curvature extending continuously between the central portion (12) of the pipe (10) and the increased thickness end section (22A) and formed from a radius (R2). An external upset (20) is first formed in forging steps as shown in FIGS. 2 and 4 by radially expanding and squeezing the end of pipe (10). Then the final forging step radially contracts the external upset (20) to form the internal upset (20A) as shown in FIGS. 3 and 5. The finished internal upset 20A as shown in FIG. 7 has a transition section 24A with an inner peripheral curved surface 28A formed from a radius (R2). The forging steps are performed with a single heating of the metal drill time in a minimum of time preferably within around one (1) minute but in any event less than around two (2) minutes.

3 Claims, 3 Drawing Sheets

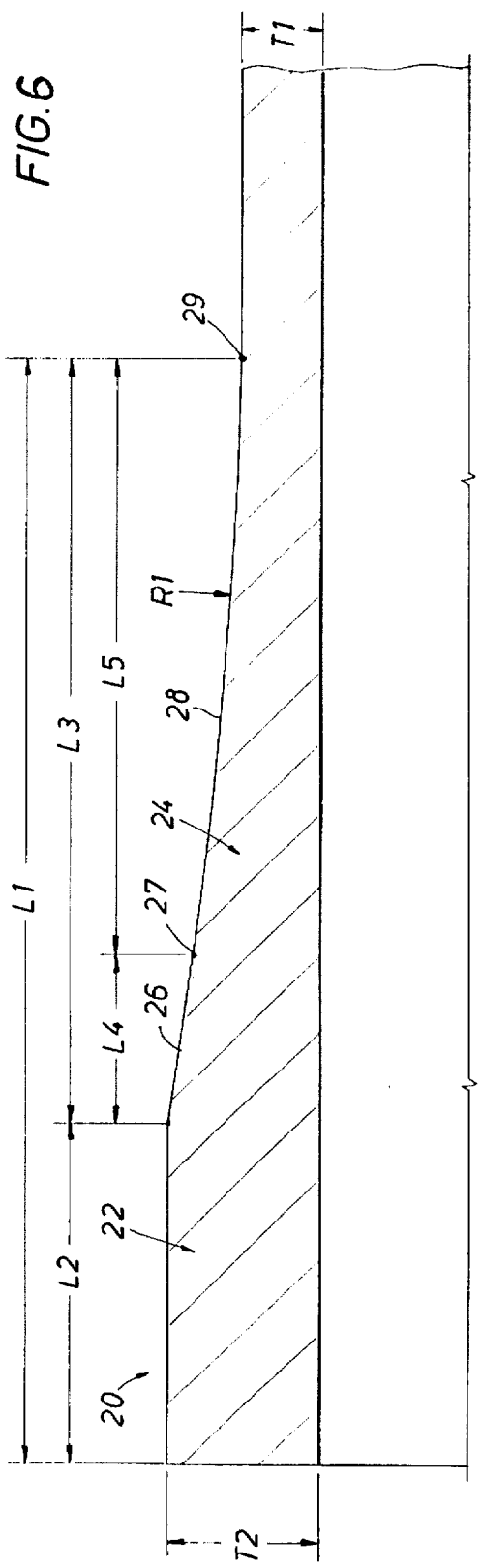
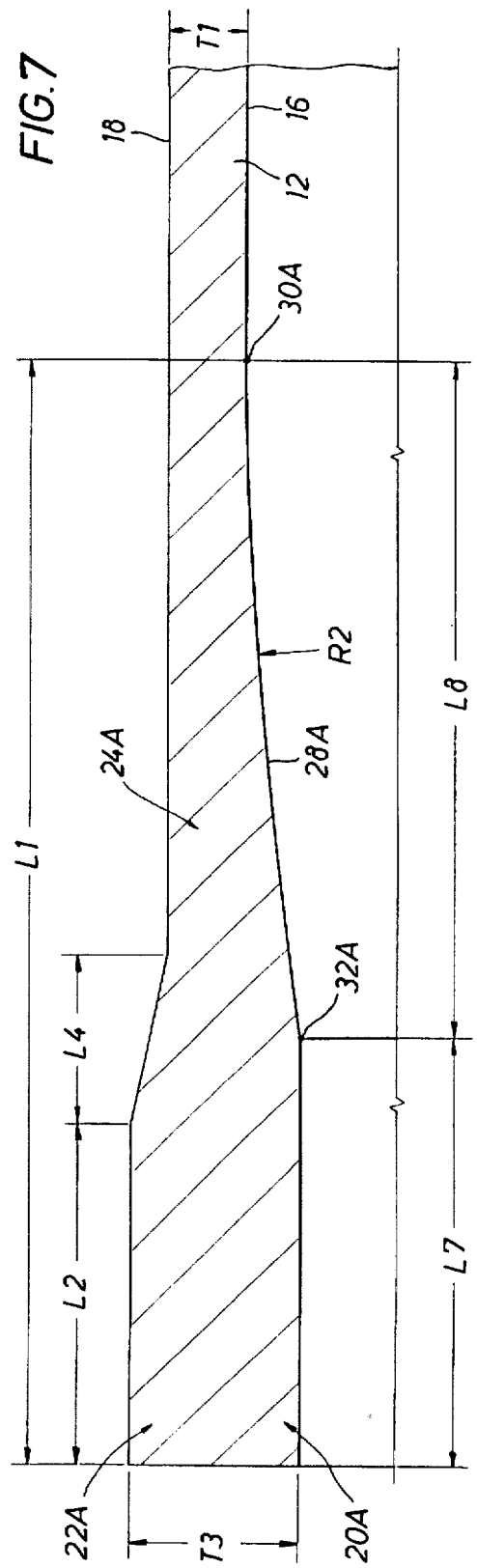

METAL PIPE HAVING UPSET ENDS

CROSS REFERENCE TO RELATED APPLICATIONS

This application is a divisional application of application Ser. No. 08/338,959 filed Nov. 14, 1994, now U.S. Pat. No. 5,517,843, which is a continuation-in-part of application Ser. No. 08/214,391 filed Mar. 16, 1994, now abandoned.

BACKGROUND OF THE INVENTION

1. Field of the Invention

This invention relates to metal pipe having upset ends, and more particularly to an internal upset end for metal pipe.

2. Description of the Prior Art

Metal pipe such as drill pipe is normally assembled by joining adjacent lengths of drill pipe. The ends of the drill pipe are normally upset for welding to a threaded tool joint for connection of adjacent pipe lengths. The drill pipe lengths prior to forming of the upset ends and threads are of a constant wall thickness and have uniform inner and outer peripheries.

A conventional method of forming an upset end utilizes a die and mandrel to form in a forging operation an external upset portion of increased wall thickness. Then, in a separate step with another die and mandrel, the end of the pipe is pressed or squeezed inwardly to form an internal upset portion. However, the internal upset portion is not formed against the mandrel or constrained by the mandrel, and it is difficult to control the shape of the transition section between the central portion of the drill pipe and the upset end of increased wall thickness. Further, it is difficult to control the length of the transition section which has a varying wall thickness. Stress concentrations usually occur in the transition section to provide high stress concentration factors (S.C.F.). The transition section heretofore has been formed of a taper and it has been found desirable to have a long length transition section to minimize stress concentrations.

A common fatigue failure today is from rotary bending in a section of the drill hole in which there is a change in direction of hole angle. Under a bending moment, fatigue cracks are initiated at the external surface of the pipe body where a minimum wall thickness is provided and in the transition section of the internal upset as stress concentrations occur in the transition section. In the pipe body, the bending stress at the external surface is always higher than that of the internal surface. However, in the transition section or area, the stress at the internal surface may exceed the stress at the external surface as a result of excessive stress concentrations. Thus, fatigue cracks are indicated at the transition section of the internal upset. For design purposes, the transition section should be designed so that the bending stress at the transition section never exceeds the bending stress at the external surface of the pipe body. This problem was considered in a paper presented in 1988 to the International Association of Drilling Contractor (IADC) and Society of Petroleum Engineers (SPE) designated as paper IADC/SPE 17206, and entitled "Appropriate Design of Drillpipe Internal Upset Geometry Focusing on Fatigue Property" authored by Y. Tsukano, S. Nishi, H. Miyoshi and Y. Sogo.

A finite element analysis was utilized for stress analysis of the drill pipe subjected to bending moment. A purpose of the study including the finite element analysis was to obtain the appropriate internal upset geometry and full size fatigue tests were carried out. The study was conducted on a 5 inch diameter pipe having a weight of 19.5 lbs. per foot. The finite element analysis was evaluated by full size fatigue tests and excellent correlation was achieved. In order to characterize the internal upset geometry, two parameters were adopted, i.e. the internal taper length (Miu) and the radius of curvature (R). FIG. 9 of the paper shows a measurement of the internal upset geometry in which the length of the transition section (Miu) is 97.50 ml (3.838 inches) and the radius (R) at the juncture of the transition section with the body of the pipe has a length of 297.53 ml (11.714 inches). The stress concentration factor decreases with an increase in length of the internal taper as shown particularly in FIG. 5 of the paper. Likewise, an increase in the length of the radius results in a decrease in the stress concentration factor as shown in FIG. 5.

U.S. Pat. No. 4,845,972 dated Jul. 11, 1989 is directed to the method for forming the internal upset and steel drill pipe as presented generally in the above paper IADC/SPE 17206. The '972 patent states it is difficult to control the shape of the internal upset portion which includes the taper as this portion is not restrained by the mandrel. Underfill and buckling are apt to occur at the transition area or taper of the drill pipe. The steel pipe is formed by a method of external upset forging and a method for pressing the external upset portion by means of an internal upset die. Two sets of upset dies and mandrels are utilized in this method. As shown particularly in FIG. 2(C), for example, a radius of curvature is shown at a starting point 5b of the internal upset portion with the taper shown at 5 having a taper length of 5a. The radius shown at 5e forms a juncture of the taper with the body of the pipe. Thus, only a very small portion of the entire transition section or area has a radius of curvature.

U.S. Pat. No. 5,184,495 dated Feb. 9, 1993 illustrates a method of internally and externally upsetting the end of a metal pipe utilizing four separate forging steps and one reheating step after the first two forging steps. A transition section between the upset portion and the inner wall of the pipe has a conical internal surface. Two forging steps are used to initially upset the pipe externally and after reheating of the pipe two subsequent forging steps are used to upset the pipe internally to form the finished shape defining an internal conical surface for the transition section. An internal radius of curvature of a relatively small axial length connects the internal conical surface and the internal wall surface of the pipe.

SUMMARY OF THE PRESENT INVENTION

The present invention is particularly directed to a method for making an internal upset on the end of a metal drill pipe in which the transition section between the pipe body and the upset end portion of increased wall thickness is formed of a single full radius without any taper. Extensive finite element analysis has shown that the lowest stress concentration factor for any length of the transition section comprises a full radius without any taper. A radius of curvature is provided for the entire length of the transition section along its internal surface or periphery regardless of the particular length of the transition section.

The method for forging the transition section on the metal drill pipe including the internal upset preferably utilizes three different sets of upset dies and mandrels without any reheating of the pipe being required. The final external upset is normally formed from two sets of dies and mandrels, such as shown in FIGS. 2A and 2B of the aforementioned U.S. Pat. No. 5,184,495, and the third set is for forming the finished internal upset in a final forging step. In the initial forming step, a mandrel within a die radially expands the end of a pipe a predetermined initial amount, and then in a second step with another die and mandrel set, the end of the pipe is radially expanded further to form the final external upset with the inner peripheral surface of the drill pipe remaining unchanged. Thus, the external upset is formed by the mandrel squeezing or pushing the end of the drill pipe radially outwardly against the adjacent die. The external shape and volume of the final external upset is designed to be similar to the finished internal shape and volume of the internal upset and is transferred from the external surface of the drill pipe to the internal surface of the drill pipe in the final forging or forming step. To accomplish such a transfer of shape and volume, the volume of steel material for a plurality of predetermined lengths or longitudinal elements, such as longitudinal elements of 0.03 inches in length, for example, from the end of the drill pipe to the end of the internal upset or transition system is calculated for the desired finished internal upset. The volume of each longitudinal element or slice for the finished internal upset is calculated by multiplying the annular area of the longitudinal element by the length of the element. Corresponding longitudinal elements on the external upset are provided with the same calculated volumes for the internal upset and a transition section is formed on the external upset having a radius of curvature similar to the radius of curvature for the finished internal upset. Thus, the volume of steel material in each longitudinal section for the final external upset is the same as the corresponding element in the finished internal upset. After the end of the steel drill pipe is expanded radially outwardly to form the final external upset, the final forging step squeezes the end portion of the pipe radially inwardly for forming the internal upset and the radius of curvature for the transition section. The internal transition section is of a varying wall thickness which increases in thickness from the central pipe body to the uniform increased wall thickness at the end of the pipe. An optimum length of the transition section that has been found to be satisfactory is between one and two times the inside diameter of the pipe. However, lengths of the transition section between around one-half the inside diameter of the pipe and four times the inner diameter of the pipe have been found to be satisfactory under certain conditions. The length of the radius for the curvature of the inner periphery of the transition section is of an optimum length around twelve times the inner diameter of the pipe. However, radii lengths of between around three and twenty times the inner diameter of the pipe have been found to be satisfactory.

A substantial advantage is obtained by the present invention in having all of the forging steps achieved with a single heating of the pipe. In order to accomplish the entire forging operation in a single heat, it is necessary that the forging operation be completed generally in around one (1) minute, but in any event less than two (2) minutes as a decrease in temperature of the pipe below a particular temperature will prevent forging steps from being accomplished. To obtain the forging steps without reheating, it is desirable to have a tube upsetting machine with at least three separate sets of dies and associated mandrels in separate cavities of the machine so that the pipe can be transferred from one set of dies adjacent one pipe cavity to another set of dies adjacent another pipe cavity in a minimum of time. The pipe is first heated to an optimum temperature range of around 2200 F. to 2400 F. in two steps by two separate electric induction coils in around two (2) minutes. The temperature should not exceed around 2600 F. in any event. The forging steps are preferably performed before the temperature drops to around 2000 F. but in no event less than around 1750 F.

The first forging step increases the wall thickness of the pipe around 50% while shortening the length, and the second forging step increases the wall thickness another 50% while further shortening the length. The first two forging steps form the external upset while maintaining generally the inner diameter of the pipe. The thickness of the pipe at the external upset is increased around 225% by the first two forging steps before the internal upset. An increase in wall thickness of at least 20% for each of the first two forging steps is required. The initial uniform wall thickness of the pipe prior to the forging operation generally ranges between 0.330 inch and 0.500 inch. Each of the three steps is performed in around twenty (20) seconds to require only around one (1) minute for the three steps of the entire forging operation. It is possible that four forging steps could be provided in a single heat under certain conditions, particularly if the tube upsetting machine is formed of four pipe cavities each with separate dies and mandrels. A suitable tube upsetting machine for forging operation is sold by Ajax Manufacturing Company of Cleveland, Ohio.

It is an object of this invention to provide an upset for metal drill pipe which has a minimal stress concentration factor.

A further object of this invention is to provide an internal upset for metal drill pipe in which only a single heating of the cold drill pipe is required thereby to perform the forging operation in a minimum of time.

Another object of the invention is to provide an internal upset for metal drill pipe which includes a transition section having a curved inner periphery to provide a minimal stress concentration factor.

An additional object is to provide such an internal upset by first forming an external upset having a volume of material along its length equal to the volume of material along the corresponding length of the finished internal upset.

A further object is to provide a method of forming an internal upset on metal drill pipe by first forging an upset on the outer surface of the pipe and then pressing the end of the pipe radially inwardly to form a transition section having an inner peripheral surface formed of a curvature.

An additional object is to provide a method for forming such an upset in which different sets of dies and mandrels are utilized with the inner surface of the transition section formed with a radius of curvature without any restraint or contact of the mandrel against the curvature of the transition section.

Other objects, features, and advantages of this invention will be apparent from the following specification and drawings.

BRIEF DESCRIPTION OF THE DRAWINGS

FIG. 6 is an enlarged sectional view of a portion of the external upset removed from the mandrel and die after the first forging step; and FIG. 7 is an enlarged sectional view of a portion of the finished internal upset removed from the die and mandrel shown in FIG. 3 after the second forging step.

DESCRIPTION OF THE INVENTION

Figure 1:
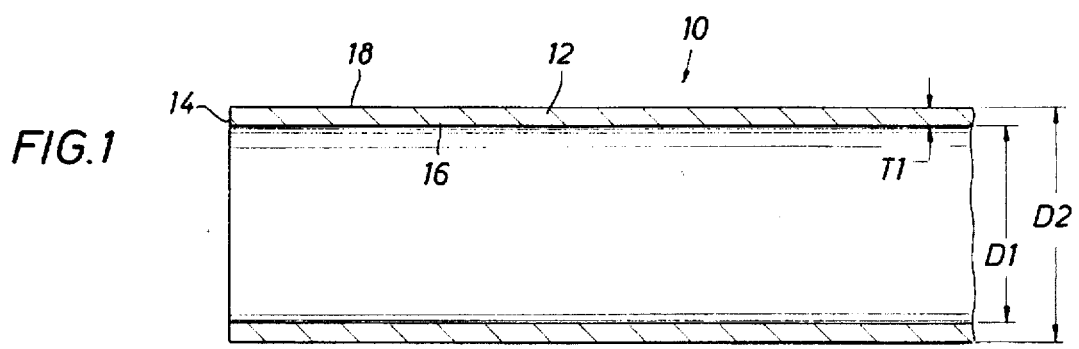
FIG. 1 is a sectional view of an end portion of a metal drill pipe prior to providing an upset on the end of the pipe.

An unfinished steel drill pipe is generally indicated at 10 in FIG. 1 and includes a body 12 having an end 14 thereon. Body 12 has an inner peripheral surface 16 and an outer peripheral surface 18 with a wall thickness therebetween indicated at T1. The inner diameter of pipe 10 is shown at D1 and the outer diameter of pipe 10 is shown at D2. Drill pipe 10 may have a length of 30 feet, for example, and separate lengths or sections of drill pipe are connected to each other for lowering within a borehole. The ends of a pipe section are normally threaded for connecting to each other in end to end relation.

Preferably a single tube upsetting machine having three separate pipe cavities with each cavity having different die and mandrel sets is provided. The cold drill pipe as shown in FIG. 1 is heated in two steps by two separate electric induction coils to an optimum temperature range between around 2200 F. and 2400 F., preferably around 2350 F., for example, and then is transferred to the tube upsetting machine. In the first forging step by a first mandrel and die set adjacent a pipe cavity in the tube upsetting machine (not shown), the end of pipe 10 is expanded radially externally around 50% while the length of pipe 10 is shortened. The heated pipe is then transferred without reheating to another cavity for the second forging step with the mandrel and die set as shown in FIG. 2.

Figure 2:
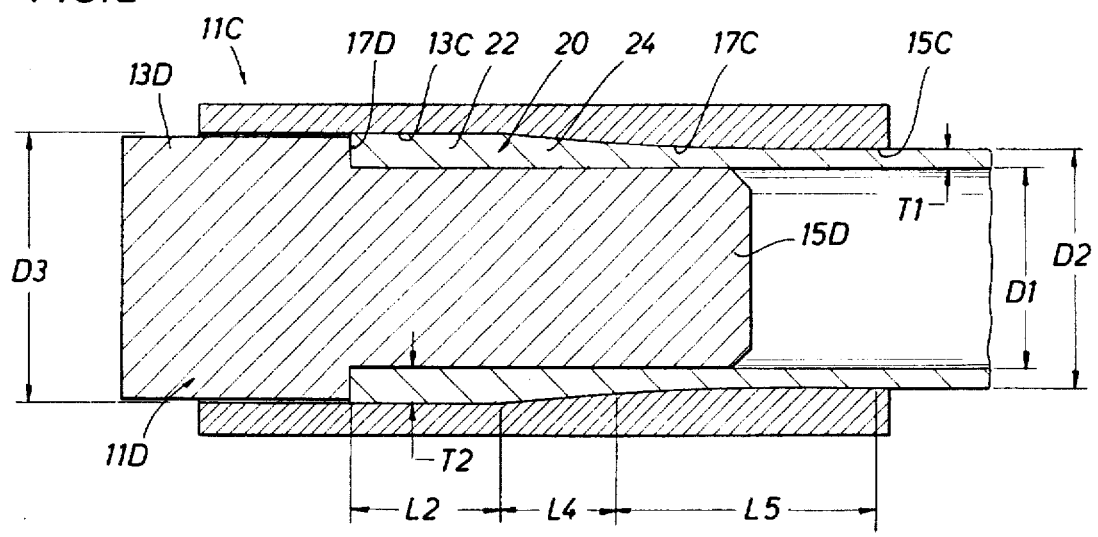
FIG. 2 is a sectional view showing a die and mandrel for forming in a forging step the final external upset on the end of the pipe having the same volume of material along its length as the volume of material along the corresponding length of the finished internal upset.

FIG. 2 illustrates the second forging step for forging the final external upset or upset end portion shown generally at 20 from the initial forging step. The first initial forging step radially expands the end of pipe 10 externally an initial predetermined amount of around 50%, for example, such as illustrated in FIG. 2A of U.S. Pat. No. 5,184,495 and incorporated herein by reference. The second forging step radially expanding the end of the pipe externally such as another 50% in thickness, to a final external upset. The second forging step utilizes a first die shown at 11C having a large diameter inner peripheral surface 13C and a small diameter inner peripheral surface 15C. An inner peripheral connecting surface 17C between peripheral surfaces 13C and 15C is provided. A first mandrel is shown at 11D having a body 13D and a projection 15D. Projection 15D is of a diameter substantially the same as internal diameter D1 of pipe 10. An annular shoulder or abutment 17D is formed between projection 15D and body 13D.

Figure 4:
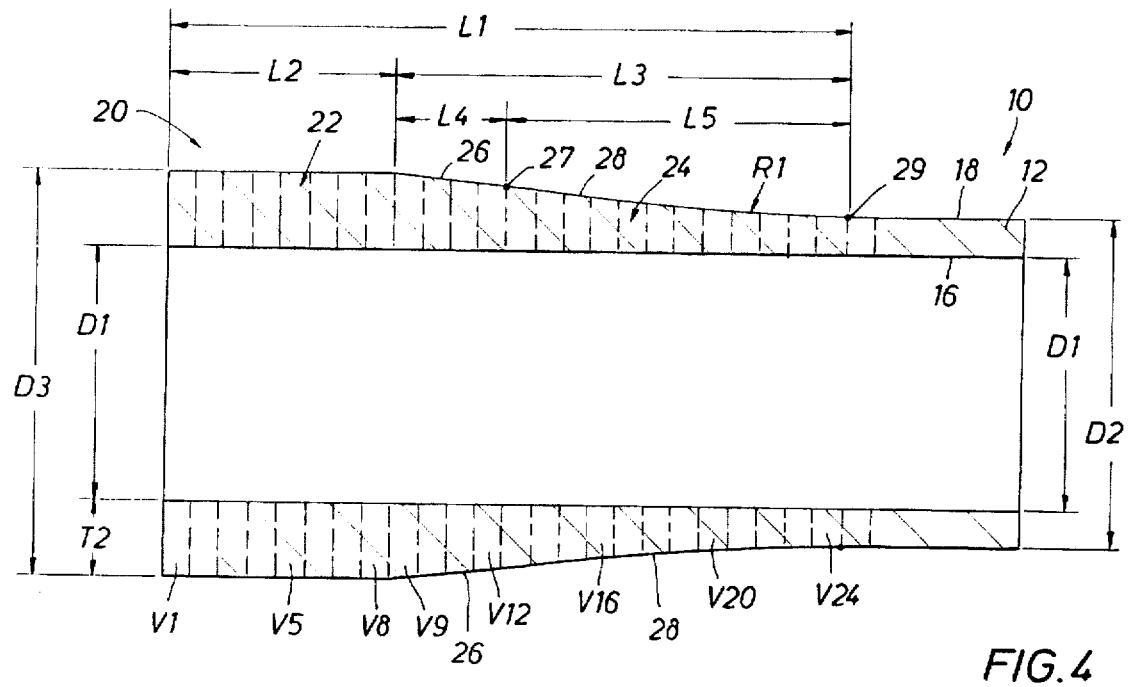
FIG. 4 is a sectional view of the external upset removed from the mandrel and die after the first forging step and showing the longitudinal elements for calculating the volume of material for each element along the entire length of the external upset end.
Figure 5:
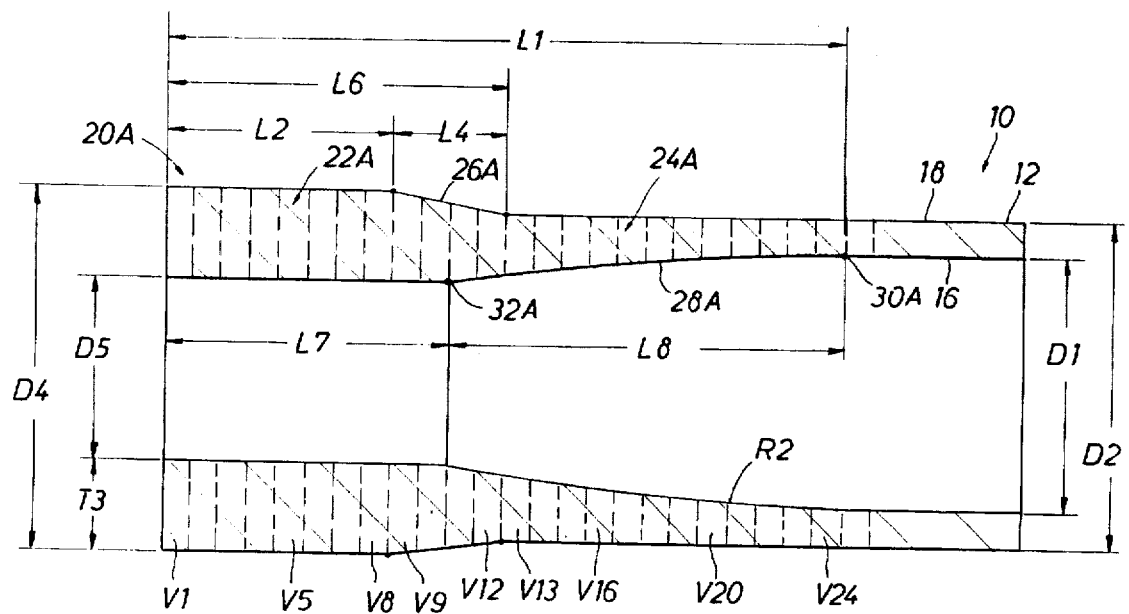
FIG. 5 is a sectional view of the internal upset removed from the mandrel and die after the second forging step and showing the longitudinal elements corresponding to the longitudinal elements of the external upset shown in FIG. 4.

The inner peripheral surface or contour of die 11C defined by connecting surface 17C and inner peripheral surface 13C is determined by the internal shape and material volume of the finished internal upset as shown in FIG. 5. For illustrative purposes, the internal upset shown in FIG. 5 is divided into twenty four (24) elements V1–V24 in calculating the material volume along the length of the internal upset. It is to be understood that any predetermined number of elements may be provided as desired for accuracy. The material volume for each longitudinal element or slice V1–V24 as denoted by the broken lines is calculated by the area of the annular slice times its length or thickness with element V24 being the smallest material volume and elements V1–V8 being the largest material volumes. The calculated material volumes for elements V1–V24 for the finished internal upset are then used for calculating the external upset shown in FIG. 4 with similar material volumes being provided for the corresponding longitudinal elements V1–V24 in FIG. 4. The radius of curvature formed by the outer peripheral surfaces of the volumes for elements V13–V24 and the conical taper formed by the volumes for elements V9–V12 are defined by connecting surface 17C which is in contact with the outer peripheral surfaces of elements V9–V24 including the radius of curvature as shown particularly by R1 in FIG. 4. The accuracy in the transfer of material from the final external upset to the finished internal upset is determined by the total number of longitudinal elements or slices with increased accuracy resulting from an increased number of longitudinal elements. In order to obtain satisfactory results in the finished internal upset for a five (5) inch outer diameter pipe, the volume V of steel material for at least around twenty (20) longitudinal elements is calculated. For optimum results with drill pipe having an outside diameter of five (5) inches, around forty (40) longitudinal elements should be calculated and utilized in the first forging step.

In the second forging step shown in FIG. 2 for the external upset, pipe 10 has been transferred to another pipe cavity in the tube upsetting machine and die 11C is placed around the end of pipe 10 without any reheating of pipe 10. Then, mandrel 11D is inserted to expand radially outwardly the end of pipe 10 to form external upset portion 20 against the adjacent surfaces 13C and 17C of die 11C. Upset end portion 20 of a total length L1 includes an upset body section 22 of a length L2 and an adjacent transition section 24 of a total length L3 as shown in FIGS. 2 and 4. Upset body section 22 has a wall thickness T2. Transition section 24 has a length L3 and is of a varying wall thickness between pipe body 12 and upset body section 22. Transition section 24 includes a conical tapered external surface 26 of an axial length L4 and an adjacent curved external surface 28 of an axial length L5. Curved external surface 28 as shown particularly in FIG. 6 is formed of a radius R1 between junctures or points 27 and 29 at the ends of curved surface 28. The inner peripheral surface 16 of pipe 10 remains unchanged in the first forging step. External upset body section 22 has an outer diameter shown at D3 and an inner diameter D1. The inner peripheral surface of die 11C conforms to the adjacent surface of transition section 24.

Figure 3:
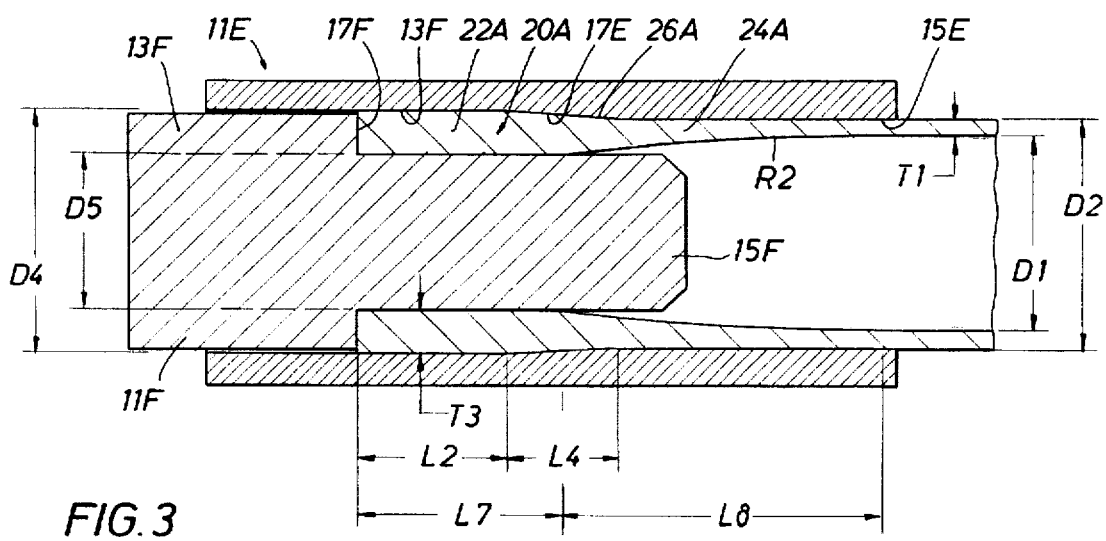
FIG. 3 is a sectional view of a different die and mandrel for pressing or squeezing the end portion of the pipe radially inwardly to form an internal upset including a transition section having a curved inner peripheral surface.

Referring to FIG. 3, the final forging step for forming the finished internal upset or upset end portion 20A without any reheating of pipe 10 is shown. A die is shown at 11E and includes a large diameter inner peripheral surface 13E and a small diameter inner peripheral surface 15E. A connecting inner peripheral surface is shown at 17E and defines a tapered surface 17E between inner peripheral surfaces 13E and 15E. A mandrel is shown at 11F having a body 13F and a projection 15F of a reduced diameter D5. Annular abutment 17F is shown between projection 15F and mandrel body 13F. The diameter of projection 15F on mandrel 11F is substantially smaller than the diameter of projection 15D on mandrel 11D. External upset end portion 20 of mandrel 11F is pressed or squeezed radially inwardly against the adjacent surface of projection 15F to define internal upset end portion 20A and to increase the thickness of upset end section 22A as shown at T3. An external taper 26A of a conical shape similar to taper 26 is formed on the outer periphery of upset end portion 20A as required by some specifications for drill pipe and is of a similar length L4 as determined by taper 17E on die 11E. Also, the axial length of finished upset end section 22A is L2, which is similar to the axial length of upset end section 22 after the forging step shown in FIG. 2.

Referring also to FIGS. 5 and 7 in which the finished internal upset portion 20A is shown after the final forging step, the internal axial length of body section 22A is shown at L7. Internal transition section shown at 24A has an axial length L8. The total wall thickness T3 of upset end body section 22A of the finished upset end portion 20A is substantially larger than the wall thickness T2 of external upset end portion 20 after the forging step for completing the external upset.

Referring now particularly to FIG. 7, the finished internal upset end portion 20A is shown including transition section 24A and upset body section 22A. Transition section 24A has a varying wall thickness and a length L8. The inner peripheral surface 28A of transition section 24A has an inner concave curvature. Inner curved surface 28A begins at a juncture 30A with pipe body 12 and extends to juncture 32A with upset body section 22A. Curved surface 28A has a radius R2 extending between junctures 30A and 32A. The axial length L8 of transition section 24A is at least around one-half the internal diameter D1 of pipe 10 and preferably is generally equal to external diameter D2. Length L8 may be as high as three times the external diameter D2 of pipe 10 for satisfactory results. Radius R2 between junctures 30A and 32A is determined by length L8 of transition section 24A.

Radius R2 is of an optimum length of around twelve times the diameter of pipe 10. Radius R2 is at least around three times the axial length L8 of transition section 24A and may be as high as twenty times the length of transition section 24A.

As a specific but nonlimiting example for a five (5) inch outside diameter steel drill pipe utilizing the method of the invention as set forth above, the following dimensions in inches of a drill pipe upset according to the invention are presented in Table I.

TABLE I

| D1- | 4.276  | L5- | 5.750 |
|-----|--------|-----|-------|
| D2- | 5.000  | L6- | 5.500 |
| D3- | 5.926  | L7- | 4.250 |
| D4- | 5.250  | L8- | 7.000 |
| D5- | 3.500  | T1- | 0.724 |
| L1- | 11.250 | T2- | 1.476 |
| L2- | 3.000  | T3- | 1.750 |
| L3- | 8.250  | R1- | 71.22 |
| L4- | 2.500  | R2- | 63.33 |

The inner dimensions of die 11C conform generally to the outer dimensions of external upset portion 20. The inner dimensions of die 11E conform generally to the outer dimensions of internal upset portion 20A. Projection 15D of mandrel 11D has a diameter D1 of 4.276 while mandrel 11F is illustrated as inches. Projection 15F of mandrel 11F has a diameter D5 of 3.500 inches. While projection 15F for mandrel 11F has been illustrated as having the same outer diameter D5 as the inner diameter of internal upset end section 22A, it is understood that a small tolerance will be provided between projection 15F and upset end section 22A.

As a result of the calculation of material volume along the length of the finished internal upset 20A for a predetermined number of elements or slices along the axial length of the upset, and then transferring this calculation to the precise corresponding elements in the final external upset 20, the finished internal upset 20A is formed in two forging steps with a transition section 24A having a curved inner peripheral surface 28A of a concave curvature. An outer curved surface 28 of the external upset is transferred during the final forging step to the internal upset and forms inner curved surface 28A on transition section 24A. Inner curved surface 28A has a large radius R2 and a long axial length L8 at least greater than one-half the internal diameter of pipe 10. Such a transition section for a finished internal upset has been found to provide low stress concentrations. It is understood that curved peripheral surface 28A may be formed of different curved shapes effective to provide low stress concentrations. For example, surface 28A could be formed of contiguous convex and concave portions which merge in a smooth juncture.

The internal upset is formed on the metal drill pipe in three separate forging steps in around one (1) minute with a single heating of the cold drill pipe. A single tube upsetting machine having three pipe cavities performs all of the forging steps. It is to be understood, however, that the radial contracting of the external upset after the first two forging steps, could be performed in two separate forging steps under certain conditions with a single heating of the metal pipe. In this event, it would be desirable to provide a pipe upsetting machine having four cavities since the entire forging operation should be performed in around one (1) minute without any reheating of the pipe. It may be feasible, under certain conditions to perform the entire forging operation in one and one-half (1½) minutes but in no event would the forging operation take over two (2) minutes without any reheating as the decrease in temperature of the pipe would not permit an adequate forging step to be performed.

A new and improved method for making upset ends on metal drill pipe and the resulting product have been disclosed which meet all of the objectives of the present invention, and which incorporate numerous unique features and advantages as set forth herein. Since certain changes or modifications may be made in the disclosed embodiment without departing from the inventive concepts involved, it is the aim of the appended claims to cover all such changes and modifications falling within the true spirit and scope of the present invention.

What is claimed is:

1. A metal pipe having a central portion of uniform inner and outer peripheral surfaces and an internal upset end portion adjacent said central portion at an end of said pipe, said internal upset end portion comprising:

an end section of an increased outer diameter and wall thickness at the end of said upset end portion and defining inner and outer peripheral surfaces; and an inner transition section of a varying wall thickness between said central portion and said end section; said inner transition section having an inner peripheral surface extending between said inner peripheral surface of said central portion and said inner peripheral surface of said end section, said inner transition section having an axial length which is greater than one-half the inside diameter of said central portion of said pipe, and said inner peripheral surface of said transition section being of an inner concave curvature formed from a radius having a length which is at least three times the axial length of said transition section.

2. A metal pipe as set forth in claim 1 wherein said end section has an outer peripheral surface of a uniform diameter and an outer tapered surface of a frustoconical shape extending between said outer peripheral surface of said end section and said outer peripheral surface of said central portion.

3. A metal pipe as set forth in claim 1 wherein said curvature is characterized by a single continuous radius of curvature.

\* \* \* \* \*